United States Patent
Berney

(10) Patent No.: US 6,491,229 B1
(45) Date of Patent: Dec. 10, 2002

(54) CONTACTLESS CHIP CARD ASSOCIATED WITH RF TRANSMISSION MEANS

(75) Inventor: Jean Claude Berney, Morges (CH)

(73) Assignee: NJC Innovations Sarl (CH)

( * ) Notice: Subject to any disclaimer, the term of this patent is extended or adjusted under 35 U.S.C. 154(b) by 0 days.

(21) Appl. No.: 09/423,535

(22) PCT Filed: May 8, 1998

(86) PCT No.: PCT/CH98/00190

§ 371 (c)(1),
(2), (4) Date: Nov. 9, 1999

(87) PCT Pub. No.: WO98/52141

PCT Pub. Date: Nov. 19, 1998

(30) Foreign Application Priority Data

May 9, 1997 (CH) .............................................. 1086/97

(51) Int. Cl.⁷ .............................................. G06K 19/06
(52) U.S. Cl. .................... 235/492; 235/382.5; 343/788
(58) Field of Search ................................ 235/492, 380, 235/382.5; 343/787, 788

(56) References Cited

U.S. PATENT DOCUMENTS

| | | | | |
|---|---|---|---|---|
| 4,692,604 A | * | 9/1987 | Billings | 235/493 |
| 4,782,342 A | * | 11/1988 | Walton | 340/941 |
| 4,837,556 A | * | 6/1989 | Matsushita et al. | 340/310.01 |
| 5,198,647 A | * | 3/1993 | Mizuta | 235/449 |
| 5,412,192 A | * | 5/1995 | Hoss | 235/380 |
| 5,572,478 A | * | 11/1996 | Sato et al. | 365/226 |
| 6,335,686 B1 | * | 1/2002 | Goff et al. | 340/572.4 |

FOREIGN PATENT DOCUMENTS

JP 410145267 * 5/1998

* cited by examiner

Primary Examiner—Mark Tremblay
(74) Attorney, Agent, or Firm—Baker Botts L.L.P.

(57) ABSTRACT

The invention concerns a chip card associated with RF transmission means. Said chip card comprises on each surface high permeability zones arranged so as to concentrate the flux generated by the RF transmission means onto a sensor coil. To ensure the proper functioning of the system, the transmission means generate flux lines parallel to the surface of the chip card.

10 Claims, 5 Drawing Sheets

CONTACTLESS CHIP CARD ASSOCIATED WITH RF TRANSMISSION MEANS

The most prevalent smartcards on the market most often include a access system via contacts, which poses certain problems as to reliability and excludes any possibility of communication from a distance. In order to overcome this problem, certain manufacturers propose incorporating a passive RF system into the card, which allows both the card's integrated circuit to be supplied with power and communication with the circuit to be assured. This type of card includes one or more pick up coils connected to the integrated circuit and placed in the thickness of the card. These coils can be of the conventional coiled wire type, but may also be etched onto the surface of the printed circuit acting as interconnection support or etched directly on the surface of the integrated circuit. These solutions are interesting, but currently come up against restrictions as to their use which limit the field of application thereof. Indeed, in order to be polyvalent, this type of card should be able to answer equally well the requirements of conventional bank cards and the requirements of "hands free" access cards. This polyvalence is desirable not only for the card itself, but also for the associated RF transmission means which allow reading from, and even writing to the card. In the case of bank cards, the RF transmission occurs at a short distance, but the read-write means must be simple and compact so as to be able to be incorporated in portable, light apparatus, such as are increasingly used in commerce and restaurants. In the case of "hands free" cards, more voluminous and sophisticated RF transmission means can be used, but significant reading distances of up to a meter are sought.

In both cases, it is important to have the best magnetic coupling possible between the card, and particularly the pick up coil or coils, and the RF transmission means allowing reading from and writing to the card. The present invention proposes precisely a particular card/RF transmission means combination allowing this magnetic coupling to be significantly improved, in all the aforementioned applications. The invention concerns a smartcard associated with RF transmission means for communicating with said smartcard and supplying it with power as required, this smartcard including at least one pick up coil connected to an integrated memory circuit, characterised in that said RF transmission means are arranged so as to generate lines of flux parallel to the surface of said smartcard, the latter including on its two faces zones of high magnetic permeability arranged so as to pick up these lines of flux across a first face, and to transfer them to a second face at the location in which the pick up coil(s) are situated. The smartcard can also have multiple applications, it may for example be an electronic memory tag.

Figure 4:
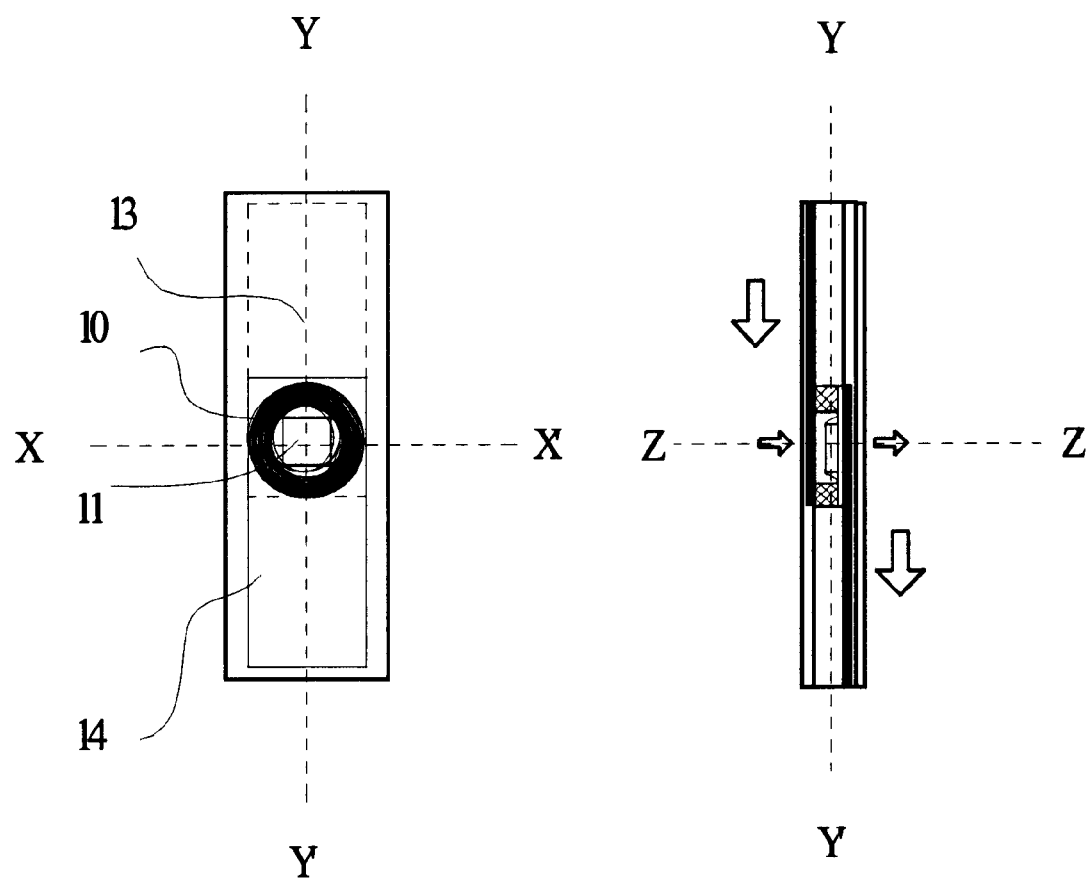

FIG. 4, schematically by way of example another card/RF transmission means combination for short distance coupling according to the invention.

Figure 5:
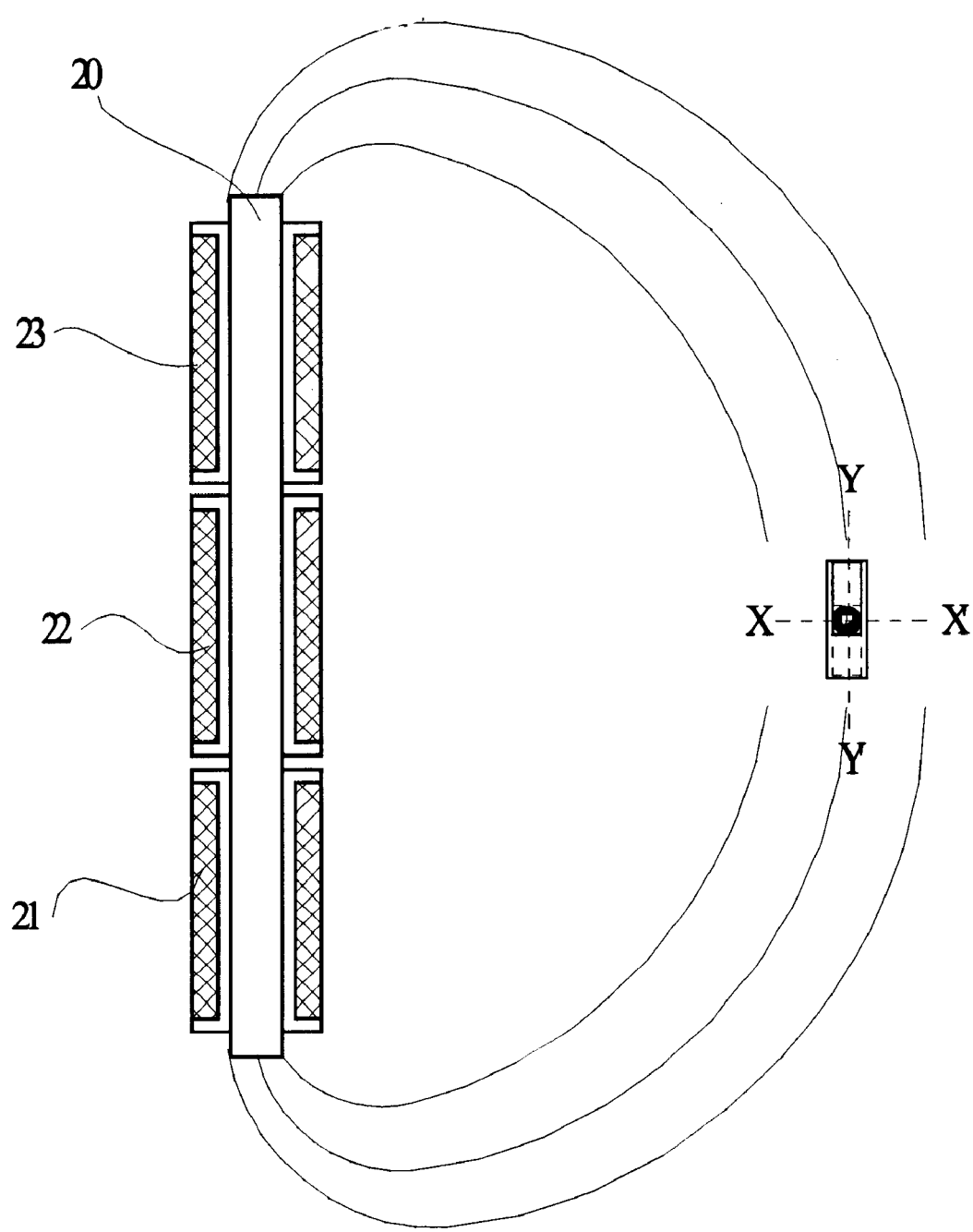

FIG. 5 shows schematically by way of example another card/RF transmission means combination for long distance coupling according to the invention.

Figure 1:
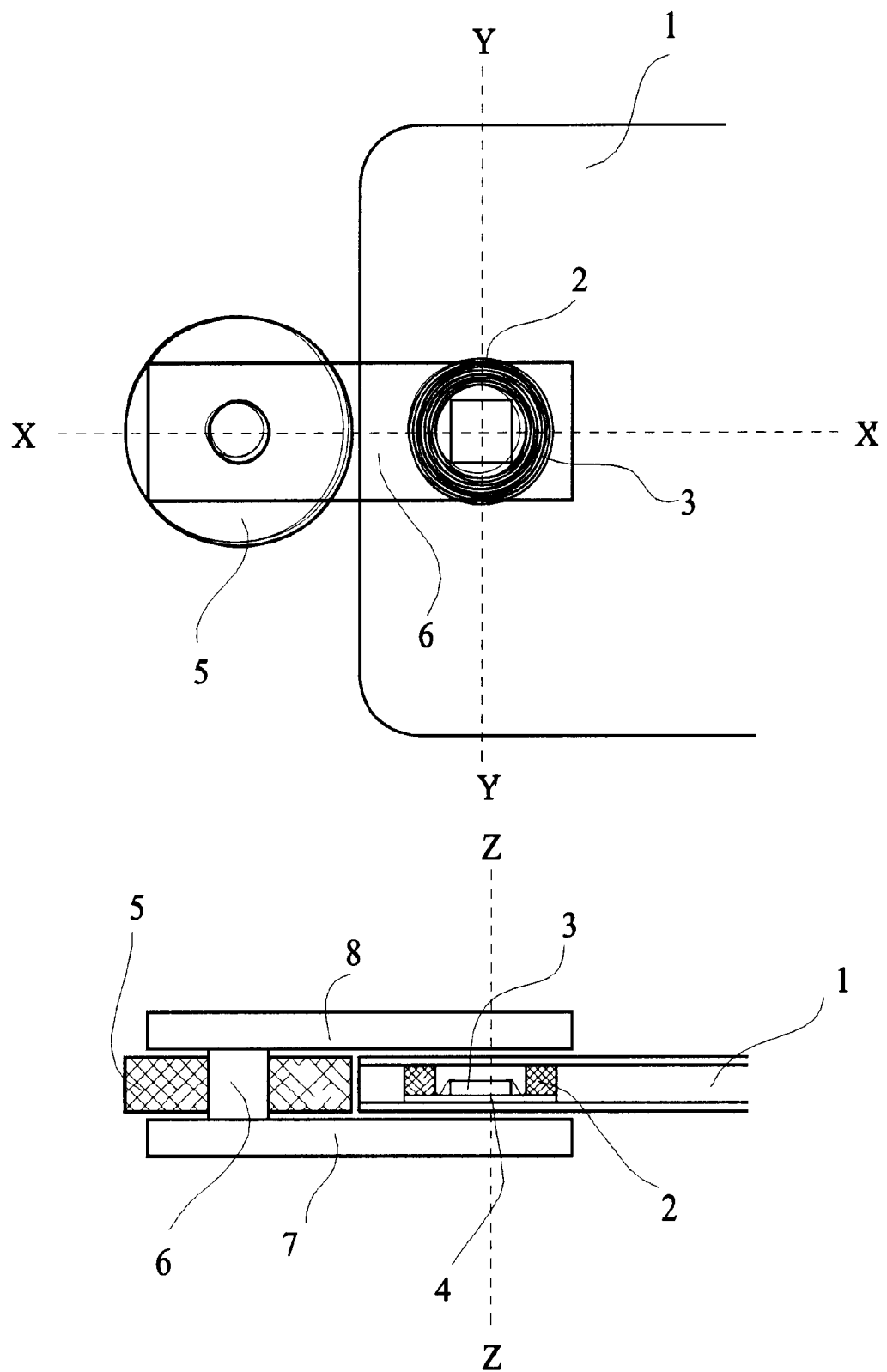
FIG. 1 shows schematically by way of example for the understanding of the invention a known card/RF transmission means combination for short distance connection.

FIG. 1 shows schematically by way of example for the understanding of the invention a known card/RF transmission means combination for short distance coupling. In this configuration, card 1 includes a pick up coil 2 and an integrated memory circuit 3 mounted on an interconnection printed circuit 4. The whole is incorporated in the thickness of card 1. Since this thickness is small, the copper volume is obviously limited, and therefor the number of turns of pick up coil 2. In the case shown, this pick up coil is of the conventional coiled wire type. For reasons of cost, certain manufacturers make said coil by etching directly on printed circuit 4, or directly on integrated circuit 3. It goes without saying that the number of turns is then significantly or very significantly reduced. In order to have good magnetic coupling and to assure proper RF transmission, a maximum of flux must be made to pass through said coil. This flux must be along the ZZ' axis of the pick up coil, i.e. perpendicular to the card surface of the plane formed by axes XX' and YY'. In the configuration shown, the smartcard is simply introduced into a slot ad hoc, as occurs in portable apparatus. In this configuration, the flux can be generated by a primary coil 5 and directed onto pick up coil 2 by magnetic circuit 6 which includes two flanges 7 and 8. For the coupling to be correct, pick up coil 2 must be sandwiched between the two flanges 7 and 8. This configuration is however not optimum. Primary coil 5 is short and the number of its turns is limited. The two flanges 7 and 8 of the magnetic circuit are close to each other and a good portion of the flux generated by primary coil 5 passes from one flange to the other outside pick up coil 2. Finally the length of flanges 7 and 8 must be short, so that the coil/integrated circuit assembly must be placed close to the edge. The card thus has only one axis of symmetry XX' and thus includes a compulsory direction of introduction.

Figure 2:
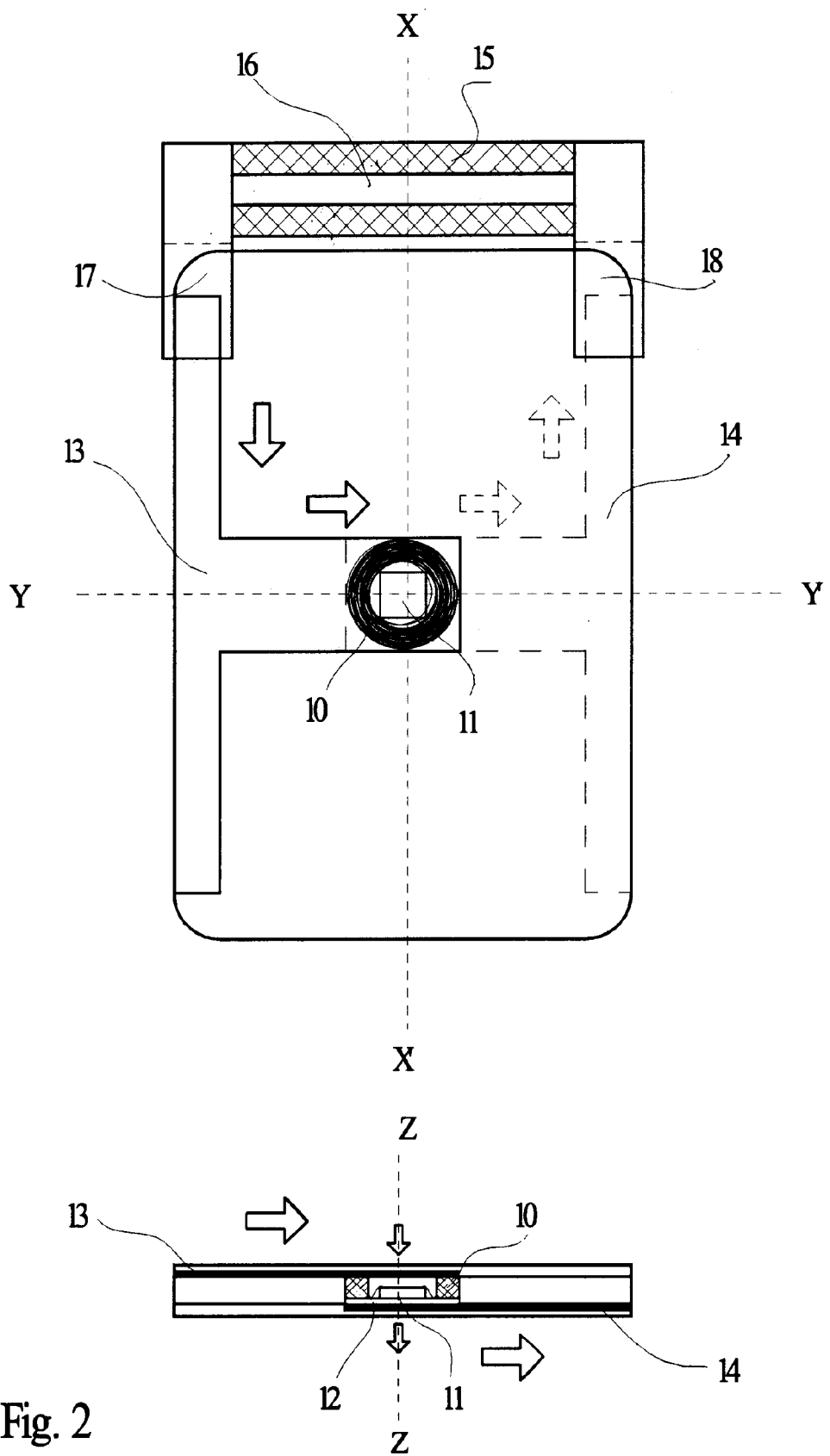
FIG. 2 shows schematically by way of example a first card/RF transmission means combination for short distance coupling according to the invention.

FIG. 2 shows schematically by way of example a first card/RF transmission means combination for short distance coupling according to the invention. This Figure shows a pick up coil 10 having an axis ZZ' and an integrated memory circuit 11 mounted on an interconnection printed circuit 12, and placed at the centre of the card. The plane of the card extends across axes XX' and YY'. The card is for example a rectangular smartcard with a longer XX' axis than YY' axis. Other card geometries are of course possible. This card includes T shaped zones of high permeability, one zone across upper surface 13, and one zone across lower surface 14. These T shaped zones of high permeability 13 and 14 are superposed facing pick up coil 10 so that the flux collected on the upper face by high permeability zone 13 passes through the card facing pick up coil 10 to pass into high permeability zone 14 as indicated by the arrows. These high permeability zones can be formed for example of thin sheets of metal cut to the desired shape. They may also be formed of ferrite particles mixed with a binding agent, and deposited on the surface of the card by serigraphy or any similar method. One thus obtains very advantageous thin layers in this type of application. The thickness of the high permeability zone can be adjusted if necessary by superposing several layers. It should be recalled however that the flux involved is very small and there is no risk of saturation even for very thin layers. The RF transmission means include primary coil 15 mounted on a magnetic circuit 16 including two flanges 17 and 18. These two flanges include slits into which the end of the smartcard can be inserted. It can be seen that in order to create lines of flux parallel to the surface of the smartcard according the invention the axis of primary coil 15 is placed in the plane of the card, for example in the YY' direction, and not perpendicular to the plane of the card as in the preceding Figure. Without increasing the volume, this allows primary coil 15 to be long, and thus to have a high number of turns. Moreover, the two flanges 17 and 18 are very widely spaced. The flux thus tends to pass in priority through high permeability zones 13 and 14.

Thus, these zones guide almost the entirety of the flux generated by primary coil 15 across pick up coil 10. There is thus a significant improvement in the coupling between the primary coil and the pick up coil, which is the object of the present invention. It is also to be noted that the card has two axes of symmetry XX' and YY'. There is thus no compulsory direction of insertion, which is an indisputable practical advantage.

Figure 3:
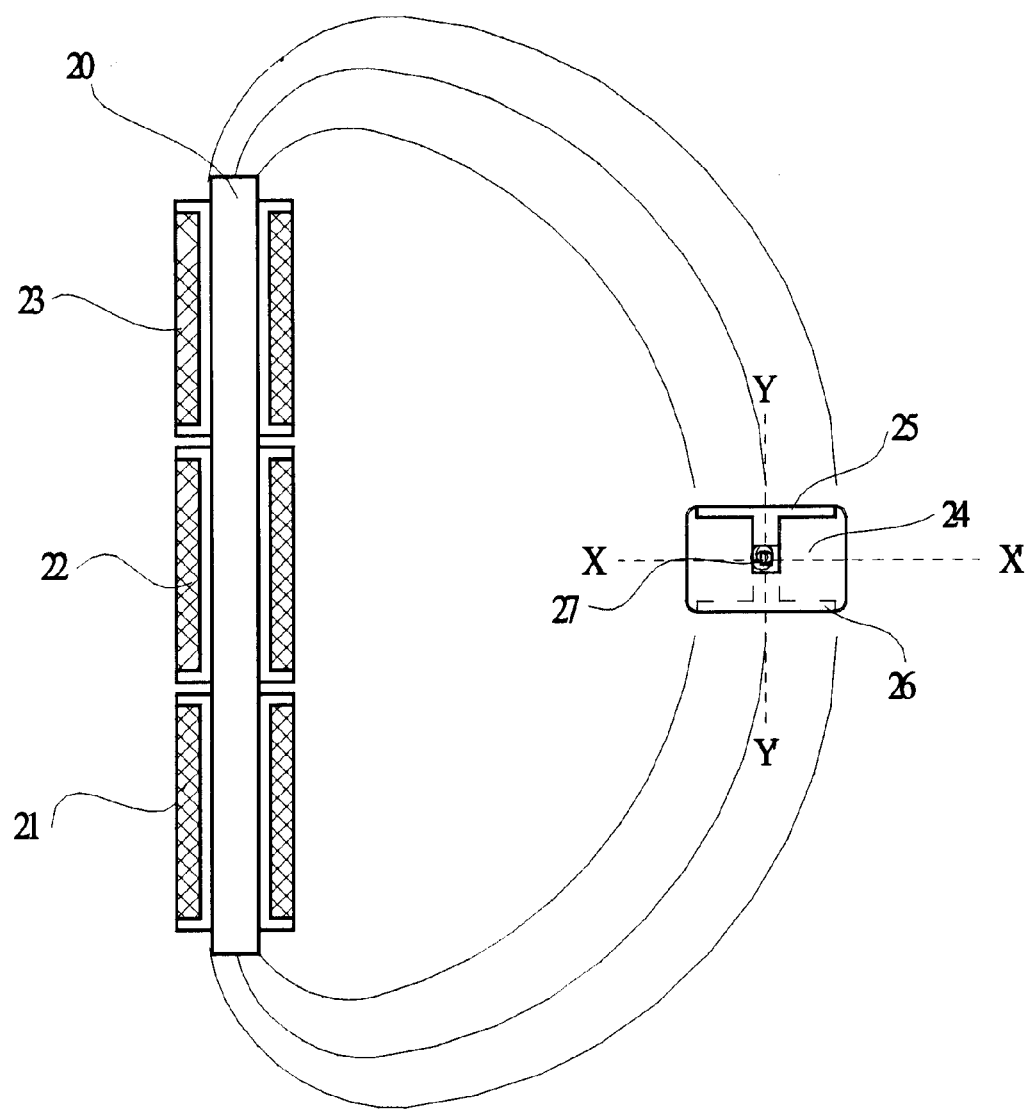
FIG. 3 shows schematically by way of example a first card/RF transmission means combination for long distance coupling according to FIG. 2.

FIG. 3 shows schematically by way of example a first card/RF transmission means combination for short distance coupling according to FIG. 2. If the configuration proposed by the invention has numerous advantages for short distance transmission, it is even more advantageous for long distance transmission. Here again, the arrangement of the RF transmission means necessary for implementing the invention differs fundamentally from the currently used conventional means. Indeed, in conventional "hands free" access systems, one assumes that the smartcard has to be positioned vertically, for example in a pocket. Thus, in order to have flux perpendicular to the surface of the card which passes right through the pick up coil, it is necessary to generate horizontal lines of flux. In our case lines of flux must be generated parallel to the surface of the smartcard, i.e. vertical lines of flux for example in the direction of the YY' axis. For this purpose, the RF transmission means include a magnetic core 20 on which are mounted one or more primary coils 21, 22, 23 capable of generating vertical lines of flux. In fact the length of core 20 can be adapted to the working distance which one wishes to obtain. It can range from several centimeters to 1 or even 2 meters. As it is not practical to make coils of this length, it is preferable to be able to stack several coils which can be connected in series or in parallel as required.

Let us see what happens when a smartcard according to the invention 24 is placed in the path of the flux generated by primary coils 21, 22, 23. Upstream, high permeability zone 25 will pick up the lines of flux which pass in proximity, across its entire length, and direct them downstream across high permeability zone 26. In order to do this the flux collected must pass from one face of the card to the other at the location in which coil 27 is situated. Permeability zones 25 and 26 thus operate like a funnel which forces the flux passing in proximity to the card to be concentrated across the coil. The fact of increasing the part of the flux generated by the primary coils which passes in pick up coil 27 allows a significant improvement in the magnetic coupling, which is an object of the present invention.

FIGS. 4 and 5 show schematically by way of example another card/RF transmission means combination for short and long distance coupling according to the invention. This combination is very similar to that of FIGS. 2 and 3. The major difference consists in the dimensions and the use of the card. The smartcard according to FIGS. 4 and 5 can be used as a simple electronic tag. The present discussion is thus limited in particular to the differences with respect to the first combination according to FIGS. 2 and 3. A pick up coil 10 is again shown oriented along the ZZ' axis and an integrated memory circuit 11 mounted on an interconnection printed circuit, and placed at the centre of the card. Unlike a conventional smartcard, a tag can be smaller and it can have very varied geometries. The embodiment according to FIGS. 4 and 5 shows by way of example a tag in the form of a ribbon extending in a plane with a XX' axis substantially smaller that the YY' axis. This card includes high permeability zones, not T shaped, but rectangular, one zone on lower surface 14, and another zone on upper surface 14. These rectangular high permeability zones 13 and 14 are superposed facing pick up coil 10 so that the flux collected on the lower face by high permeability zone 14 passes through the card facing coil 10 to pass into high permeability zone 13 as indicated by the arrows. These high permeability zones can be formed for example of thin sheets of metal cut to the desired shape. They can also be formed of ferrite particles mixed with a binding agent, and deposited on the surface of the card by serigraphy or any other similar method. Very advantageous thin layers are thus obtained in this type of application. The thickness of the high permeability zone can be adjusted if necessary by superposing several layers. Long distance transmission as described hereinbefore in the case of the application of the invention by a smartcard according to FIG. 3 is of course also possible in the same manner for the application by a tag shown by FIG. 5. Those skilled in the art once familiar with the present invention can make other geometries for the high permeability zones for other applications without departing from the scope of the invention.

All the solutions described can be extended to smartcards including several pick up coils, for example two concentric pick up coils.

There are of course many other application possibilities for the invention, but the description thereof would not bring additional elements to the comprehension thereof.

What is claimed is:

1. System including a smartcard and RF transmission means for communication with said smartcard and supplying it with power as required, this smartcard including at least one pick up coil connected to an integrated memory circuit, characterised in that said RF transmission means are arranged so as to generate lines of flux parallel to the surface of said smartcard, the latter including on its two faces zones of high magnetic permeability arranged so as to pick up these lines of flux across a first face, and to transfer them to a second face at the location in which the pick up coil is situated.

2. System including a smartcard and RF transmission means according to claim 1, characterised in that said high permeability zones are arranged so that the smartcard has two axes of symmetry facing the RF transmission means.

3. System including a smartcard and RF transmission means according to claim 1, characterised in that said high permeability zones are T shaped or rectangular, and are arranged so that the zone of the first face covers the zone of the second face facing the pick up coil.

4. System including a smartcard and RF transmission means according to claim 1, characterised in that said zones are made by surface deposition of particles of high permeability material mixed with a binding agent.

5. System including a smartcard and RF transmission means according to claim 1, characterised in that the RF transmission means include at least one primary coil mounted on a core of elongated shape arranged parallel to the surface of the smartcard.

6. System including a smartcard and RF transmission means according to claims 1, characterised in that the RF transmission means include at least one primary coil mounted on a magnetic circuit arranged at the end of the smartcard, and are arranged so as to generate lines of flux parallel to the surface of said smartcard in the direction of the width.

7. System including a smartcard and RF transmission means according to claims 1, characterised in that the RF transmission means are fixed and include at least one primary coil mounted on a magnetic circuit, and are arranged so as to generate vertical lines of flux.

8. Use of a smartcard in a system according to claim 1, characterised in that it is used as a "hands free" access card or electronic and/or magnetic tag.

9. System including a smartcard and RF transmission means according to claim 5 characterised in that the RF transmission means include at least one primary coil mounted on a magnetic circuit arranged at the end of the smartcard, and are arranged so as to generate lines of flux parallel to the surface of said smartcard in the direction of the width.

10. System including a smartcard and RF transmission means according to claim 5 characterised in that the RF transmission means are fixed and include at least one primary coil mounted on a magnetic circuit, and are arranged so as to generate vertical lines of flux.

* * * * *